(12) United States Patent
Kato

(10) Patent No.: US 12,506,433 B2
(45) Date of Patent: Dec. 23, 2025

(54) DRIVE SYSTEM AND VEHICLE

(71) Applicant: ISUZU MOTORS LIMITED, Yokohama (JP)

(72) Inventor: Kota Kato, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 200 days.

(21) Appl. No.: 18/587,015

(22) Filed: Feb. 26, 2024

(65) Prior Publication Data

US 2024/0305234 A1 Sep. 12, 2024

(30) Foreign Application Priority Data

Mar. 10, 2023 (JP) ................. 2023-037558

(51) Int. Cl.
*H02P 27/08* (2006.01)
*B60L 15/00* (2006.01)
*H02J 7/00* (2006.01)

(52) U.S. Cl.
CPC ............ *H02P 27/08* (2013.01); *B60L 15/007* (2013.01); *H02J 7/0013* (2013.01); *H02J 7/0048* (2020.01); *H02J 7/0063* (2013.01); *H02J 7/00712* (2020.01); *B60L 2210/44* (2013.01); *H02J 2207/20* (2020.01)

(58) Field of Classification Search
CPC ...... B60L 50/51; B60L 2210/44; B60L 50/60; B60L 15/20; B60L 2210/40; B60L 2240/427; B60L 2240/429; B60L 2240/527; B60L 3/003; B60L 3/0061; B60L 3/0038; B60L 3/0084; B60L 3/0092; B60L 53/22; B60L 58/18; H02J 7/0048; H02J 7/0063; H02J 1/102; H02J 7/0013; H02J 2207/20; H02P 27/08; H02P 21/0021; H02P 27/06; H02P 6/28; H02P 29/02; H02P 29/027; H02P 29/024; H02P 27/085; H02P 25/03; H02P 25/062; H02P 25/022; H02P 25/064; H02P 25/08; H02P 21/22; H02P 7/29; H02P 6/12; H02P 2101/45; H02P 2207/05; H02H 7/122; H02H 3/087; H02M 1/007;
(Continued)

(56) References Cited

U.S. PATENT DOCUMENTS

2019/0296664 A1* 9/2019 Matsubara ................ H02P 6/12
2020/0062140 A1 2/2020 Zhou et al.

FOREIGN PATENT DOCUMENTS

JP 2019-170044 A 10/2019
JP 2020-519223 A 6/2020

* cited by examiner

*Primary Examiner* — Antony M Paul
(74) *Attorney, Agent, or Firm* — PROCOPIO, CORY, HARGREAVES & SAVITCH LLP

(57) ABSTRACT

A drive system includes: a first inverter that outputs first alternating current by switching first direct current with a switching element (first switching element), to an electric motor generating power for propelling a vehicle; a second inverter that supplies, to the electric motor, second alternating current having the same frequency as the first alternating current by switching direct current with a switching element (second switching element); and a control part that performs PWM control on the first inverter and the second inverter such that an ON-time of the first switching element in one cycle of the first alternating current becomes longer than an ON-time of the second switching element when the direct current is smaller than the direct current.

8 Claims, 4 Drawing Sheets

(58) Field of Classification Search
CPC .......... H02M 1/32; H02M 7/49; H02M 7/493; H02M 1/4233; B60Y 2200/92
See application file for complete search history.

DRIVE SYSTEM AND VEHICLE

CROSS-REFERENCE TO RELATED APPLICATIONS

The present application claims priority to Japanese Patent Application number 2023-037558, filed on Mar. 10, 2023 contents of which are incorporated herein by reference in their entirety.

BACKGROUND OF THE INVENTION

The present disclosure relates to a drive system that propels a vehicle using an electric motor, and a vehicle equipped with the drive system. Driving an electric motor in a vehicle through electric power supplied from a plurality of batteries has been proposed (e.g., Japanese Unexamined Patent Application Publication (Translation of PCT Application) No. 2020-519223). In Japanese Unexamined Patent Application Publication (Translation of PCT Application) No. 2020-519223, the connection of a plurality of batteries in parallel is described as a means to reduce the risk of the vehicle being unable to travel in a case of battery failure.

BRIEF SUMMARY OF THE INVENTION

In the technique described in Japanese Unexamined Patent Application Publication (Translation of PCT Application) No. 2020-519223, variations in internal resistance among a plurality of batteries may lead to a situation where a battery with relatively low internal resistance outputs a large current compared to a battery with relatively high internal resistance. Consequently, there is a tendency for overcurrent to occur in batteries with lower internal resistance.

The present disclosure has been made in view of these points, and its object is to provide a drive system and a vehicle capable of preventing overcurrent in any one of a plurality of batteries when there are variations in internal resistance among the batteries.

A drive system according to a first aspect of the present disclosure includes: a first battery that outputs first direct current; a first inverter that outputs first alternating current to an electric motor that generates power for propelling a vehicle by switching the first direct current with a first switching element; a second battery that outputs second direct current; a second inverter that outputs second alternating current having the same frequency as the first alternating current to the electric motor by switching the second direct current with a second switching element; and a control part that performs PWM control on the first inverter and the second inverter such that an ON-time of the first switching element in one cycle of the first alternating current becomes shorter than an ON-time of the second switching element, when the second direct current is smaller than the first direct current.

A vehicle according to a second aspect of the present disclosure includes: an electric motor that generates power for propelling the vehicle; a first battery that outputs first direct current; a first inverter that outputs first alternating current to the electric motor by switching the first direct current with a first switching element; a second battery that outputs second direct current; a second inverter that outputs second direct current having the same frequency as the first alternating current to the electric motor by switching the second direct current with a second switching element; and a control part that performs PWM-control on the first inverter and the second inverter such that an ON-time of the first switching element in one cycle of the first alternating current becomes longer than an ON-time of the second switching element, when the second direct current is smaller than the first direct current.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

Outline of the Vehicle

Figure 1:
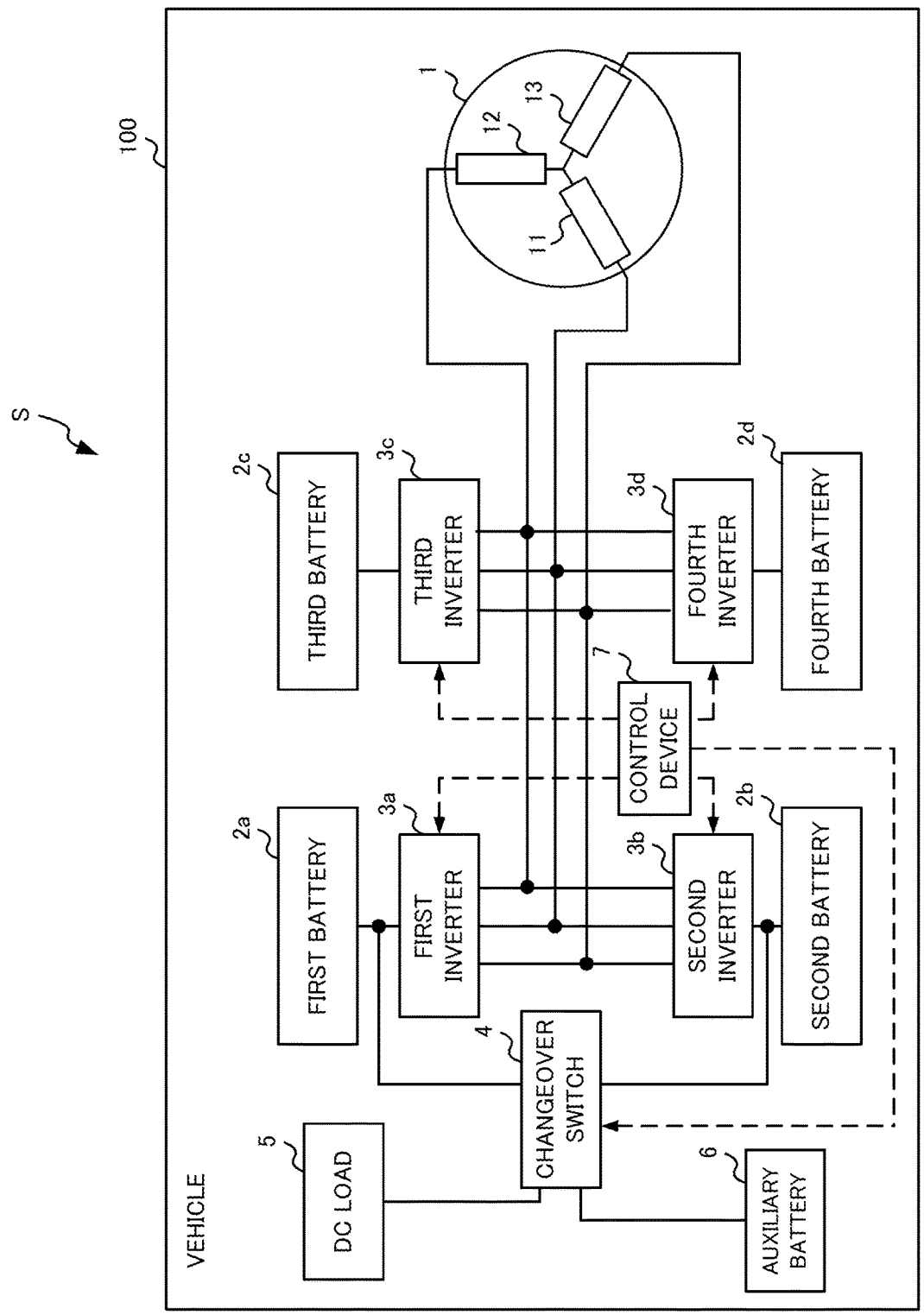
FIG. 1 shows a configuration of a vehicle, which is an example of a drive system according to an embodiment.

FIG. 1 shows a configuration of a vehicle 100, which is an example of a drive system S of the present embodiment. The vehicle 100 includes an electric motor 1, a plurality of batteries 2, a plurality of inverters 3, a changeover switch 4, a DC load 5, an auxiliary battery 6, and a control device 7. The plurality of batteries are a battery 2a (first battery), a battery 2b (second battery), a battery 2c (third battery), and a battery 2d (fourth battery), respectively. The plurality of inverters 3 are an inverter 3a (first inverter), an inverter 3b (second inverter), an inverter 3c (third inverter), and an inverter 3d (fourth inverter), respectively. The electric motor 1 includes a U-phase stator coil 11, a V-phase stator coil 12, and a W-phase stator coil 13. In the example herein, the vehicle 100 is an electric vehicle. As an example, the vehicle 100 is a commercial vehicle such as a truck or a bus.

The electric motor 1 generates power to propel the vehicle 100. For example, the electric motor 1 is a permanent magnet synchronous motor (PMSM). The battery 2a outputs direct current Ia. For example, the battery 2a is a battery pack that houses a protection circuit for preventing overcharging or the like, a charge/discharge circuit, and the like, in addition to battery cells. The battery 2b outputs direct current Ib. For example, in a similar manner as the battery 2a, the battery 2b is a battery pack that houses a protection circuit for preventing overcharging or the like, a charge/discharge circuit, and the like, in addition to battery cells. The battery 2c outputs direct current Ic. For example, in a similar manner as the battery 2a, the battery 2c is a battery pack that houses a protection circuit for preventing overcharging or the like, a charge/discharge circuit, and the like, in addition to battery cells. The battery 2d outputs direct current Id. For example, in a similar manner as the battery 2a, the battery 2d is a battery pack that houses a protection circuit for preventing overcharging or the like, a charge/discharge circuit, and the like, in addition to battery cells.

The inverter 3a switches the direct current Ia (first direct current) output from the battery 2a with a switching element therein, thereby outputting alternating current ac1 to the electric motor 1. In the example of the present specification, the inverter 3a supplies three-phase alternating current to each of the U-phase stator coil 11, the V-phase stator coil 12, and the W-phase stator coil 13. The inverter 3a is connected in parallel to the inverter 3b, the inverter 3c, and the inverter 3d.

In a similar manner as the inverter 3a, the inverter 3b switches the direct current Ib (second direct current) output from the battery 2b with a switching element therein, thereby outputting alternating current ac2 having the same frequency as the alternating current ac1 to the electric motor 1. In a similar manner as the inverter 3a, the inverter 3b supplies three-phase alternating current to each of the U-phase stator coil 11, the V-phase stator coil 12, and the W-phase stator coil 13.

In a similar manner as the inverter 3a, the inverter 3c switches the direct current Ic (third direct current) output from the battery 2c with a switching element therein, thereby supplying alternating current ac3 having the same frequency as the alternating current ac1 to the electric motor 1. In a similar manner as the inverter 3a, the inverter 3d switches the direct current Id (fourth direct current) output from the battery 2d with a switching element therein, thereby outputting alternating current ac4 having the same frequency as the alternating current ac1 to the electric motor 1.

The changeover switch 4 is an element for switching whether or not to supply direct current from at least one of the battery 2a or the battery 2b to a predetermined DC load 5. The changeover switch 4 operates to supply direct current from at least one of the battery 2a or the battery 2b to the DC load 5 under the control of the control device 7. For example, in a state where a control signal indicating a mode for supplying direct current from the battery 2a or the like to the DC load 5 has been input from the control device 7, the changeover switch 4 conducts a current between at least one of the battery 2a or the battery 2b and the DC load 5. At this time, the changeover switch 4 causes the battery 2a or the like to supply direct current to the DC load 5.

In a state where a control signal indicating a mode for supplying direct current from the battery 2a or the like to the DC load 5 has not been input from the control device 7, the changeover switch 4 electrically disconnects the battery 2a and the battery 2b from the DC load 5, and stops the battery 2a or the like from supplying direct current to the DC load 5. It should be noted that although the battery 2a and the battery 2b are connected to the changeover switch 4 in FIG. 1, at least one of the battery 2c or the battery 2d may be connected to the changeover switch 4, and at least one of the battery 2c or the battery 2d may supply direct current to the DC load 5 via the changeover switch 4.

The DC load 5 is a DC motor for opening and closing a wing provided on mounted equipment of the vehicle 100, for example. The DC load 5 may be a freezing device or a refrigeration device installed in the mounted equipment of the vehicle 100.

The auxiliary battery 6 is connected to the DC load 5 via the changeover switch 4. The auxiliary battery 6 supplies direct current to the DC load 5.

The control device 7 is an Electronic Control Unit (ECU), for example. The control device 7 outputs alternating current to the electric motor 1 by performing PWM control on each inverter 3.

When there are variations in internal resistance among the plurality of batteries 2, the control device 7 sets the length of an ON-time of the switching element of each inverter 3 during PWM control so that the average value of a current to be supplied from each battery to the electric motor 1 becomes constant. The control device 7 sets the ON-time of the switching element of each inverter 3 such that the ON-time of the switching element of the inverter 3 corresponding to this battery 2 during PWM control becomes longer as the current value output from the battery becomes smaller.

For example, when a current value supplied from the battery 2b is smaller than a current value supplied from the battery 2a, the control device 7 sets an ON-time of the switching element or the like of the inverter 3a such that the ON-time of the switching element of the inverter 3a in one cycle of the alternating current ac1 supplied from the inverter 3a becomes shorter than an ON-time of the switching element of the inverter 3b. In this manner, the control device 7 controls each inverter 3 so that the average value of a current supplied from each battery 2 becomes substantially constant, making it possible to prevent overcurrent in any one of the plurality of batteries 2.

Configurations of the Main Parts of the Vehicle 100

Figure 2:
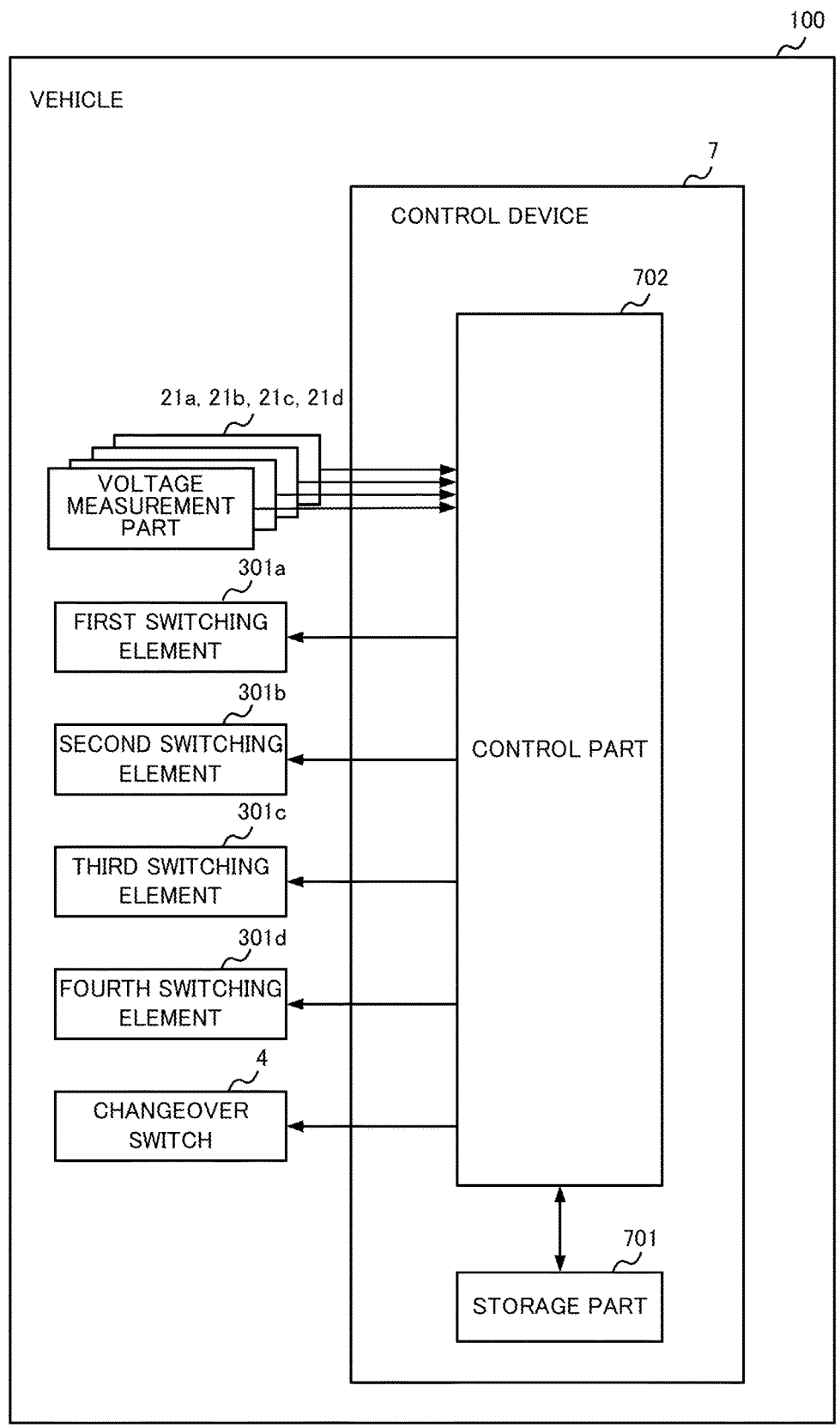
FIG. 2 shows configurations of the main parts of the vehicle.

FIG. 2 shows configurations of the main parts of the vehicle 100. The vehicle 100 includes a plurality of voltage measurement parts 21a to 22d, a switching element 301a (first switching element), a switching element 301b (second switching element), a switching element 301c (third switching element), a switching element 301d (fourth switching element), a changeover switch 4, and a control device 7. The control device 7 includes a storage part 701 and a control part 702. The switching element 301a is the switching element of the inverter 3a. The switching element 301b is the switching element of the inverter 3b. The switching element 301c is the switching element of the inverter 3c. The switching element 301d is the switching element of the inverter 3d.

A voltage measurement part 21 is provided in each battery 2, and measures a terminal voltage of the corresponding battery 2. Each voltage measurement part 21 is an A/D converter, for example. The voltage measurement part 21a measures a terminal voltage of the battery 2a. The voltage measurement part 21b measures a terminal voltage of the battery 2b. The voltage measurement part 21c measures a terminal voltage of the battery 2c. The voltage measurement part 21d measures a terminal voltage of the battery 2d. Each voltage measurement part 21 inputs measured terminal voltages to the control part 702.

The switching element 301a is provided in the inverter 3a. The switching element 301a is a power semiconductor, for example. The switching element 301a switches between a state where direct current is supplied from the battery 2a and a state where direct current is not supplied from the battery 2a. Although not shown in FIG. 2, the switching element 301a includes a U-phase switching part that outputs alternating current to be supplied to the U-phase stator coil 11, a V-phase switching part that outputs alternating current to be supplied to the V-phase stator coil 12, and a W-phase switching part that outputs alternating current to be supplied to the W-phase stator coil 13.

The switching element 301b, the switching element 301c, and the switching element 301d are provided in the inverter 3b, the inverter 3c, and the inverter 3d, respectively. The structures and operation of the switching element 301b, the switching element 301c, and the switching element 301d are similar to those of the switching element 301a, and a description thereof will be omitted.

The storage part 701 is configured with a Read Only Memory (ROM), a Random Access Memory (RAM), and the like, for example. The storage part 701 stores various programs and various types of data for causing the control part 702 to function. The control part 702 is a processor installed in the control device 7, for example. The control part 702 implements various functions by executing programs stored in the storage part 701.

For example, the control part 702 acquires a result of measuring a current supplied from the battery 2a to the inverter 3a with a current sensor (not shown). Similarly, the control part 702 acquires a result of measuring currents supplied from the batteries 2b-2d to the inverters 3b-3d with the respective current sensors (none of which are shown). Here, it is assumed that a current sensor for measuring a current supplied from each battery 2 to each corresponding inverter 3 is provided for each battery 2. Further, the control part 702 acquires a terminal voltage measured by each voltage measurement part 21.

The control part 702 switches direct current with the switching element 301a, the switching element 301b, the switching element 301c, and the switching element 301d, thereby converting the direct current supplied from each battery 2 into alternating current. More specifically, the control part 702 calculates a target value of a current to be supplied to the U-phase stator coil 11, the V-phase stator coil 12, and the W-phase stator coil 13 of the electric motor 1, on the basis of a target value or the like of the angular velocity of the electric motor 1.

The control part 702 calculates a voltage value to be applied to the U-phase stator coil 11 or the like on the basis of (i) the calculated target value of the current of the U-phase stator coil 11, the V-phase stator coil 12, and the W-phase stator coil 13, and (ii) the present current value of the U-phase stator coil 11 or the like. The control part 702 performs PWM control on each inverter 3, thereby applying a voltage with the calculated voltage value to the U-phase stator coil 11.

Adjustment of Variations in Internal Resistance Among Batteries

The control part 702 sets the length of an ON-time of the switching element 301 of each inverter 3 during PWM control, in order to reduce the influence of variations in direct current output from each battery 2 resulting from variations in internal resistance or the like among the plurality of batteries 2. At this time, the control part 702 sets the ON-time of the switching element 301 of each inverter 3 such that the ON-time of the switching element corresponding to this battery during PWM control becomes longer as the current value output from the battery becomes smaller.

For example, when the direct current Ib is smaller than the direct current Ia, the control part 702 sets the ON-times of the switching element 301a and the switching element 301b such that the ON-time of the switching element 301a in one cycle of the alternating current ac1 supplied from the inverter 3a becomes shorter than the ON-time of the switching element 301b of the inverter 3b in the same one cycle.

In the example of the present specification, the control part 702 outputs the alternating current ac1 to the electric motor 1 by performing PWM control on all the plurality of inverters 3. However, the present disclosure is not limited to this. For example, the control part 702 may output alternating current to the electric motor 1 by performing PWM control on any two or more of the plurality of inverters 3, or may supply alternating current to the electric motor 1 by performing PWM control on five or more inverters 3.

Interleaving a Plurality of Output Currents

The control part 702 supplies, to the electric motor 1, interleaved alternating current obtained by shifting a phase of the alternating current ac1 output from the inverter 3a, a phase of the alternating current ac2 output from the inverter 3b, a phase of the alternating current ac3 output from the inverter 3c, and a phase of the alternating current ac4 output from the inverter 3d, and superposing the alternating current ac1 to the alternating current ac4 on each other. This interleaving is performed by the control part 702 for the purpose of ripple reduction of alternating current output to the electric motor 1.

Figure 3A:
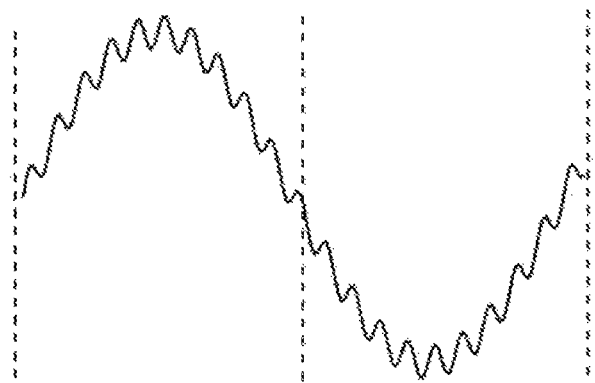
FIGS. 3A to 3C each show an example of interleaving a first output current to a fourth output current with a control part.
Figure 3B:
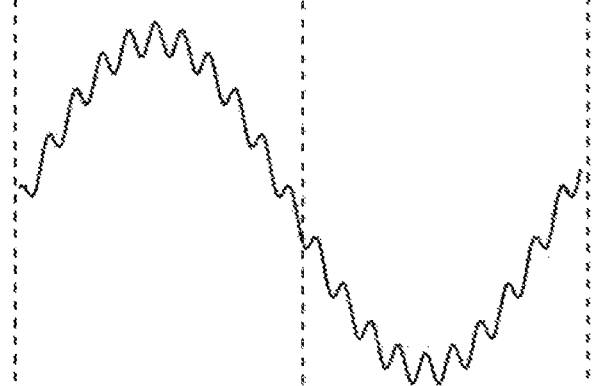
Figure 3C:
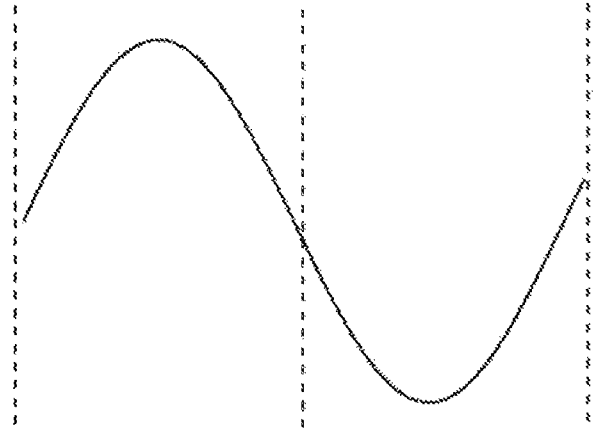

FIGS. 3A to 3C each show an example for explaining the principle of interleaving. FIG. 3A shows a graph of alternating current generated by an inverter similar to the inverter 3a to the inverter 3d. The vertical axis of FIGS. 3A to 3C represents a current. The horizontal axis of FIGS. 3A to 3C represents time. FIG. 3B is a graph of alternating current in which a phase of the ripple waveform is different from that of FIG. 3A by 180 degrees and which synchronizes the alternating current of FIG. 3A. FIG. 3C is a graph of interleaved alternating current obtained by superposing the alternating current shown in FIG. 3A and the alternating current shown in FIG. 3B on each other. In the graph of FIG. 3C, ripples are reduced compared to those of the alternating current of FIGS. 3A and 3B.

The control part 702 interleaves alternating current output from each inverter 3 by the same principle as described in the example of FIGS. 3A to 3C. As an example, the control part 702 interleaves alternating current output from each inverter 3 by making phases of the alternating current output from each inverter 3 different from each other by 90 degrees. The control part 702 inputs a control signal Sa to the switching element 301a, thereby causing the switching element 301a to switch and causing the inverter 3a to output the alternating current ac1. The control part 702 inputs, to the switching element 301b, a control signal Sb having the same frequency as the control signal Sa and having a different starting position of each cycle than the control signal Sa, thereby causing the switching element 301b to switch. The control part 702 causes the inverter 3b to output the alternating current ac2 having a different phase from the alternating current ac1.

Similarly, the control part 702 inputs a control signal Sc to the switching element 301c, thereby causing the switching element 301c to switch and causing the inverter 3c to output the alternating current ac3. The control part 702 inputs a control signal Sd to the switching element 301d, thereby causing the switching element 301d to switch and causing the inverter 3d to output the alternating current ac4.

Instances of alternating current having the same frequency and different phases from each other are superposed on each other, allowing the control part 702 to cause alternating current having a smaller ripple waveform to be input to each stator coil, compared to the original alternating current that has been output from each inverter 3. At this time, the control part 702 can reduce ripples of a voltage to be applied to each stator coil 11. Therefore, the control part 702 improves the power factor of the electric motor 1 and prevents a decrease in the accuracy of controlling the rotation speed of the electric motor 1 due to noise or the like.

Since the control part 702 generates alternating current having small ripples by interleaving to superpose alternating current of the plurality of inverters 3, the switching loss can be reduced as compared with the case of generating similar alternating current by multiplying a switching frequency of the switching element 301 by 4.

Although a case where the control part 702 interleaves alternating current of the plurality of inverters 3 has been described in the present specification, the present disclosure is not limited to the example in which the control part 702 interleaves alternating current of all the plurality of inverters 3. For example, the control part 702 may interleave alternating current of two or more of the plurality of inverters 3. The control part 702 may interleave alternating current output from five or more inverters.

PWM Control on the Basis of State of Charge

The control part 702 may set an ON-time of the switching element 301 of each inverter 3 during PWM control on the basis of a state of charge of each battery 2. First, the control part 702 estimates the state of charge of each battery 2 on the basis of a terminal voltage measured by each voltage measurement part 21. It can be said that a current value to be supplied to the electric motor 1 is larger as the state of charge is higher. Accordingly, the control part 702 may set an ON-time such that the ON-time of the switching element 301 corresponding to this battery 2 in one cycle of alternating current supplied to the electric motor 1 becomes longer as the state of charge of the battery 2 becomes higher.

For example, the control part 702 sets an ON-time of the switching element 301 of the inverter 3 corresponding to a battery 2 that has a higher estimated state of charge among the plurality of batteries 2 to be longer than an ON-time of the switching element 301 of the inverter 3 corresponding to a battery 2 that has a lower estimated state of charge. The control part 702 performs PWM control on the inverter 3 on the basis of the ON-time of the switching element 301 that has been set. In this manner, the control part 702 can drive the electric motor 1 by efficiently using electric power stored in each battery 2.

Supply of Electric Power to the DC Load 5

When operating the DC load 5, the control part 702 controls the changeover switch 4 to supply electric power from at least one of the battery 2a or the battery 2b to the DC load 5. For example, in a state where the electric motor 1 is driven, the control part 702 controls the changeover switch 4 so as to conduct a current between the auxiliary battery 6 for the DC load 5 and the DC load 5, and to electrically disconnect both the battery 2a and the battery 2b from the DC load 5. At this time, electric power is supplied from the auxiliary battery 6 to the DC load 5, but electric power is not supplied from the battery 2a and the battery 2b to the DC load 5.

In a state where the electric motor 1 is stopped, in contrast, the control part 702 controls the changeover switch 4 so as to electrically disconnect the auxiliary battery 6 for the DC load 5 from the DC load 5, and to conduct a current between at least one of the battery 2a or the battery 2b and the DC load 5. At this time, electric power is not supplied from the auxiliary battery 6 to the DC load 5, and electric power is supplied from at least one of the battery 2a or the battery 2b to the DC load 5. In this manner, since the control part 702 supplies electric power stored in the battery 2a or the battery 2b to the DC load 5 in a state where the electric motor 1 is stopped, it is possible to extend the duration until the electric power stored in the auxiliary battery 6 is consumed.

The control part 702 may supply direct current from one or more of the plurality of batteries 2 to the DC load 5 with the changeover switch 4. The control part 702 may supply direct current from five or more batteries to the DC load 5.

Processing Procedure for Controlling the Electric Motor 1 With the Control Device 7

Figure 4:
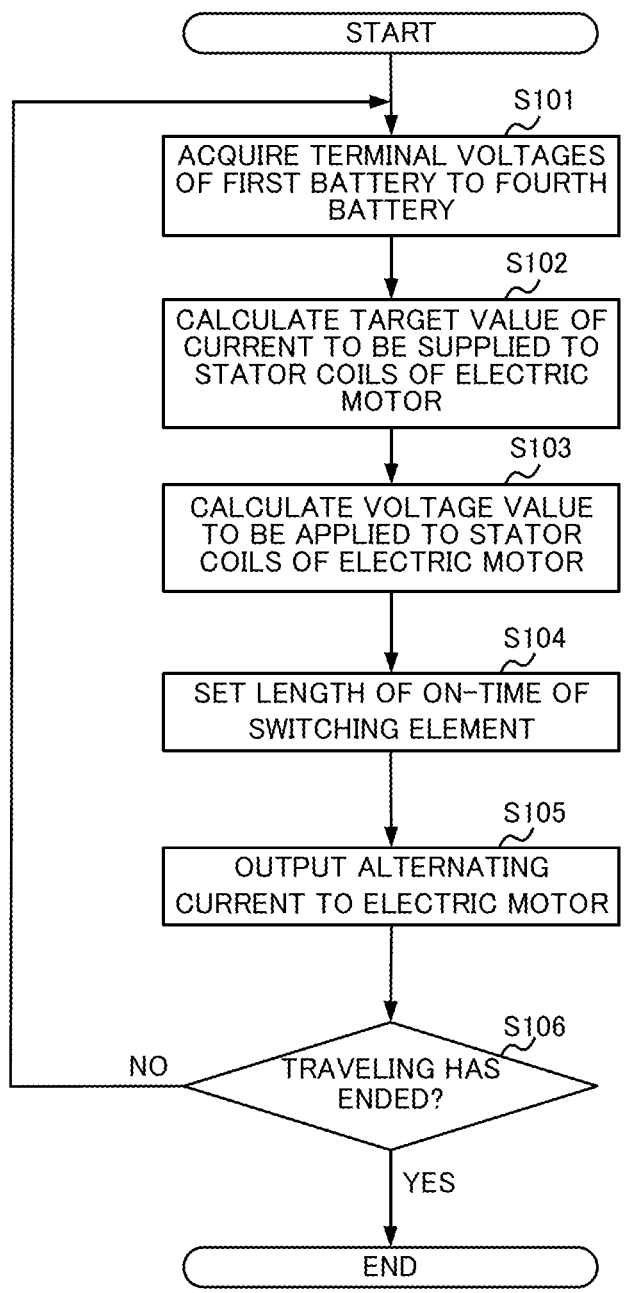
FIG. 4 is a flowchart showing a processing procedure for performing PWM control on a first inverter to a fourth inverter with the control part.

FIG. 4 is a flowchart showing a processing procedure for performing PWM control on each inverter 3 with the control part 702. This processing procedure starts when the vehicle 100 travels. First, the control part 702 acquires a terminal voltage of each battery 2, which is measured by each voltage measurement part 21 (S101).

The control part 702 calculates a target value of a current to be supplied to the U-phase stator coil 11, the V-phase stator coil 12, and the W-phase stator coil 13 of the electric motor 1, respectively, on the basis of a target value or the like of the angular velocity of the electric motor 1 (S102). The control part 702 calculates a voltage value to be applied to the U-phase stator coil 11 or the like of the electric motor 1, on the basis of the calculated target value of the current of the U-phase stator coil 11 or the like, and the present current value being supplied to the U-phase stator coil 11 or the like (S103).

On the basis of the calculated voltage value, the control part 702 sets the length of an ON-time of the switching element 301 of each inverter 3 during PWM control so that the average value of a current supplied from each battery 2 becomes constant (S104). The control part 702 performs PWM control on each inverter 3 for the ON-time that has been set, and causes alternating current to be output to the electric motor 1 (S105). The control part 702 determines whether or not traveling of the vehicle 100 has ended (S106). When it is determined that traveling of the vehicle 100 has ended ("YES" in S106), the control part 702 ends the processing. When it is determined that traveling of the vehicle 100 has not ended ("NO" in S106), the control part 702 returns to the processing of S101.

Effect of the Control Device 7 of the Present Embodiment

When a current value supplied from the battery 2b is smaller than a current value supplied from the battery 2a, the control part 702 sets an ON-time of the switching element 301a or the like such that the ON-time of the switching element 301a in one cycle of the alternating current ac1 supplied from the inverter 3a becomes shorter than the ON-time of the switching element 301b of the inverter 3b. In this manner, since the control part 702 controls the inverter 3a to the inverter 3d so that the average value of the current supplied from the battery 2a to the battery 2d becomes substantially constant, it is possible to prevent overcurrent in any one of the battery 2a to the battery 2d.

The present disclosure is explained on the basis of the exemplary embodiments. The technical scope of the present disclosure is not limited to the scope explained in the above embodiments and it is possible to make various changes and modifications within the scope of the invention. For example, all or part of the apparatus can be configured with any unit which is functionally or physically dispersed or integrated. Further, new exemplary embodiments generated by arbitrary combinations of them are included in the exemplary embodiments. Further, effects of the new exemplary embodiments brought by the combinations also have the effects of the original exemplary embodiments.

What is claimed is:

1. A drive system comprising:
a first battery that outputs first direct current;
a first inverter that outputs first alternating current to an electric motor that generates power for propelling a vehicle by switching the first direct current with a first switching element;
a second battery that outputs second direct current;
a second inverter that outputs second alternating current having the same frequency as the first alternating current to the electric motor by switching the second direct current with a second switching element; and
a control part that performs PWM control on the first inverter and the second inverter such that an ON-time of the first switching element in one cycle of the first alternating current becomes shorter than an ON-time of the second switching element, when the second direct current is smaller than the first direct current.

2. The drive system according to claim 1, wherein
the control part outputs, to the electric motor, interleaved alternating current obtained by shifting a phase of the first alternating current supplied from the first inverter and a phase of the second alternating current supplied from the second inverter and superposing the first alternating current and the second alternating current on each other.

3. The drive system according to claim 2, wherein
the control part causes the first switching element to switch by inputting a first control signal to the first switching element, and causes the second switching element to switch by inputting, to the second switching element, a second control signal having the same frequency as the first control signal and having a different starting position of each cycle than the first control signal, thereby causing the first inverter to output the first alternating current and causing the second inverter to output the second alternating current having a different phase from the first alternating current.

4. The drive system according to claim 2, wherein
the control part causes the first inverter to output the first alternating current consisting of three-phase alternating current, and causes the second inverter to output the second alternating current consisting of three-phase alternating current and having a different phase from the first alternating current.

5. The drive system according to claim 1, wherein
the control part sets an ON-time of the first switching element of the first inverter such that the ON-time of the first switching element corresponding to the first battery during PWM control becomes longer as a current value output from the first battery becomes smaller, and the control part sets an ON-time of the second switching element of the second inverter such that the ON-time of the second switching element corresponding to the second battery during PWM control becomes longer as a current value output from the second battery becomes smaller.

6. The drive system according to claim 1, further comprising:
a first voltage measurement part that measures a first terminal voltage of the first battery; and
a second voltage measurement part that measures a second terminal voltage of the second battery, wherein
the control part estimates states of charge of the first battery and the second battery on the basis of the first terminal voltage and the second terminal voltage, and performs PWM control on the first inverter and the second inverter such that an ON-time of a switching element corresponding to a battery that has a higher estimated state of charge among the first battery and the second battery, in one cycle of alternating current to be output to the electric motor from an inverter corresponding to the battery, becomes longer than an ON-time of a switching element corresponding to a battery that has a lower estimated state of charge, in one cycle of alternating current to be supplied to the electric motor from an inverter corresponding to the battery.

7. The drive system according to claim 1, further comprising:
a changeover switch for switching whether or not to supply direct current from the first battery and the second battery to a predetermined DC load, wherein
the control part causes electric power to be supplied from at least one of the first battery or the second battery to the DC load by controlling the changeover switch when the control part operates the DC load.

8. A vehicle comprising:
an electric motor that generates power for propelling the vehicle;
a first battery that outputs first direct current;
a first inverter that outputs first alternating current to the electric motor by switching the first direct current with a first switching element;
a second battery that outputs second direct current;
a second inverter that outputs second alternating current having the same frequency as the first alternating current to the electric motor by switching the second direct current with a second switching element; and
a control part that performs PWM-control on the first inverter and the second inverter such that an ON-time of the first switching element in one cycle of the first alternating current becomes longer than an ON-time of the second switching element, when the second direct current is smaller than the first direct current.

* * * * *